United States Patent [19]

Kang et al.

[11] Patent Number: 5,580,930
[45] Date of Patent: Dec. 3, 1996

[54] RUBBER COMPOSITION FOR TIRES

[75] Inventors: Jung W. Kang, Clinton; Thomas J. Lynch, Akron; Jason T. Poulton, Canton, all of Ohio

[73] Assignee: Bridgestone Corporation, Tokyo, Japan

[21] Appl. No.: 470,559

[22] Filed: Jun. 6, 1995

[51] Int. Cl.$^6$ .................... C08L 9/06; C08L 7/00; C08L 47/00
[52] U.S. Cl. .................. 525/237; 152/151; 525/232; 525/236; 526/336; 526/340
[58] Field of Search ..................... 525/237, 236, 525/232

[56] References Cited

U.S. PATENT DOCUMENTS 4,997,896  3/1991  Patterson .................. 526/174
5,174,838  12/1992  Sandstrom ............... 152/209 R Primary Examiner—Fred Zitomer
Attorney, Agent, or Firm—Frank J. Troy, Sr.

[57] ABSTRACT

Diene polymers having a high content of trans-1,4 addition and two distinct melting points in the ranges of 30° C. to 60° C. and 70° C. to 130° C. are useful as additives to tire rubbers to improve processability by reducing compound Mooney viscosity and reducing the shrinkage of various compound stocks.

5 Claims, No Drawings

RUBBER COMPOSITION FOR TIRES

FIELD OF THE INVENTION

The present invention relates to a rubber composition containing high trans-1,4-polybutadienes thereby improving processability.

BACKGROUND OF THE INVENTION

Various catalyst systems have been employed to produce high trans-1,4-polybutadienes. Certain catalyst systems have been used to produce high trans-1,4-polybutadiene having two distinct melting points. U.S. Pat. No. 5,174,838, to Sandstrom et al, discloses a cobalt based catalyst to produce a trans 1,4-polybutadiene rubber having 75% to 85% trans 1,4-content, 12% to 18% 1,2-content, 3 to about 8% cis 1,4-content and, in its uncured state, having a major melting point in a range of about 35° C. to about 45° C. and a second minor melting point in the range of about 55° C. to about 65° C. U.S. Pat. No. 5,037,912, to Patterson et al, discloses an organolithium and alkali metal alkoxide catalyst in a process for synthesizing trans 1,4-polybutadiene having a trans isomer content of about 80% to about 90% and two distinct melting points, namely a first melting point of about 60° C. to about 80° C. and a second melting point of about 135° C. to about 155° C.

U.S. Pat. No. 4,619,982 to Jenkins displays the use of a compound of a rare earth element and an organomagnesium compound to produce high trans polydiene polymers.

The use of trans 1,4-polybutadiene has been shown for various purposes including tire tread rubber compounds and increasing the green strength of rubber mixtures as disclosed in U.S. Pat. Nos. 5,174,838, 4,510,291 and Japanese Patent Application Publication No. Hei 3-65825.

High trans 1,4-polybutadiene is generally considered to be a thermoplastic resin rather than a rubber in its uncured state at room temperature due to its high crystallinity. Due to the numerous double bonds in its backbone high trans 1,4-polybutadiene is readily blended and co-cured with elastomers such as natural rubber and high cis-polybutadiene.

SUMMARY OF THE INVENTION

Diene polymers having a high content (80 to 95%) of trans-1,4 addition and two distinct melting points in the ranges of 30° C. to 60° C. and 70° C. to 130° C. are used as additives to tire rubbers to improve processability by reducing compound Mooney viscosity and reducing the shrinkage of various compound stocks.

DESCRIPTION OF THE PREFERRED EMBODIMENTS

A sulfur cured rubber composition is provided, based on 100 parts by weight of rubber, comprised of (a) about 70 to about 99, preferably about 85 to about 95 parts by weight of at least one diene rubber selected from natural rubber, cis-1,4-polyisoprene rubber, cis-1,4-polybutadiene rubber, styrene/butadiene copolymer rubber, styrene/isoprene/butadiene terpolymer rubber and 3,4-polyisoprene rubber; and (b) about 1 to about 30, preferably about 5 to about 15 parts by weight of a trans 1,4-polybutadiene characterized by having at least about a 80% trans 1,4-content.

Such trans 1,4-polybutadiene is characterized by having 80 to 95%, preferably about 86 to about 92% of its butadiene repeat units of a trans 1,4-isomeric structure, about 6 to about 8% of its units of a 1,2-structure and about 2 to about 5% of its units of a cis 1,4-structure and, in its uncured state, a first major melting point in the range of about 30° C. to about 60° C., preferably 45° C. to about 50° C. and a second minor melting point in the range of about 70° C. to 130° C., preferably 70° C. to about 107° C.

The high trans-1,4 diene polymers useful in the present invention are prepared by polymerizing a 1,3-diene monomer in the presence of the novel catalyst composition. The 1,3-diene monomers which may be employed are conjugated dienes and include 1,3-butadiene, isoprene, 1,3-pentadiene and the like. The preferred 1,3-diene monomer is 1,3-butadiene.

The catalyst system in the present invention contains four components: (a) a carboxylated metal oxy borate, (b) an organoaluminum compound, (c) an organophosphorus compound, and (d) a carboxylic acid.

The carboxylated metal oxy borate compounds which are employed as component (a) of the catalyst composition of the invention are compounds having either of the structures:

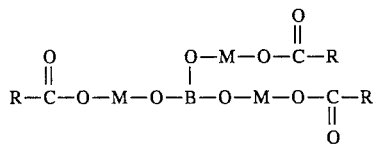

or

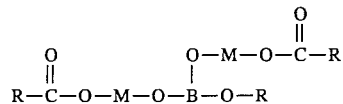

wherein R and R are alkyl radicals containing from 1 to 17 carbon atoms, preferably 7 to 17 carbon atoms and M is nickel. It should be noted that in certain instances, compounds in which R is less than 7 may be employed although the use of such compounds is not preferred due to their lack of solubility in hydrocarbon solvents. Nonetheless, such compounds may be utilized with certain mixtures of solvents. For the sake of convenience, these compounds may be represented by the shorthand formulae $(RCOOMO)_3B$ or $(RCOOMO)_2BOR$, wherein R, R, and M are as defined above.

These carboxylated metal oxy borate compounds, such as the carboxylated nickel borate may be prepared by methods known in the art such as, for example, by reacting a nickel of a carboxylic acid with an alkoxide of boron as described in detail in U.S. Pat. No. 3,296,242, the disclosure of which is incorporated herein by reference. The most preferred carboxylated metal oxy borate compounds employed in the catalyst compositions of the invention are those represented by the formula $(RCOOMO)_3B$, wherein M is nickel and R is an alkyl radical of from 7 to 11 carbon atoms. Also, for the sake of convenience, the carboxylated metal oxy borate compounds of the invention are hereinafter referred to as simply nickel borates which in the examples are designated by the abbreviations NiOB.

It should be noted at this point that the carboxylated nickel borate compounds of the invention have been employed as polymerization catalysts components in the preparation of high cis-1,4 polybutadiene polymers in U.S. Pat. No. 4,562,172 to Kang et al.

The "organoaluminum compound" as employed herein, refers to organoaluminum compounds which correspond to the formula:

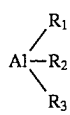

wherein $R_1$ is selected from the group consisting of alkyl (including cycloalkyl), aryl, alkaryl, arylalkyl, alkoxy, fluorine, and hydrogen, $R_2$ and $R_3$ being selected from the group of alkyl (including cycloalkyl), aryl, alkaryl, and arylalkyl.

Illustrative examples of compounds corresponding to the above formula which may be utilized include diethyl aluminum fluoride, di-n-propylaluminum fluoride, di-n-butylaluminum fluoride, diisobutylaluminum fluoride, dioctylaluminum fluoride, diphenylaluminum fluoride, trimethyl aluminum, triethyl aluminum, tri-n-propyl aluminum, triisopropyl aluminum, tri-n-butyl aluminum, triisobutyl aluminum, triperftyl aluminum, trihexyl aluminum, tricyclohexy aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzylaluminum, and other triorganoaluminum compounds. Also included are dialkylaluminum alkoxides such as diethylaluminum ethoxide, diisobutylaluminum ethoxide, dipropylaluminum methoxide, and the like. Hydrides of such organoaluminum compounds may also be utilized including diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and the like.

The preferred organoaluminum compounds are the trialkyl aluminum compounds such as trimethyl aluminum, triethyl aluminum, tri-n-propyl aluminum, tri-n-butyl aluminum, triisobutyl aluminum, trioctyl aluminum and the like, and of these, triisobutyl aluminum is particularly preferred.

Organophosphorus compounds useful as component (c) of the catalyst system correspond to the formula $(ArO)_3P$ wherein Ar is a substituted or unsubstituted aryl group. The substituted and unsubstituted aryl groups are typically aromatic hydrocarbons having 6 to 20 carbon atoms, including phenyl or naphthyl groups optionally having non-reactive substituents such as $C_1-C_6$ alkyl groups or alkoxy groups to form 4-butylphenyl, tolyl, 4-butoxyphenyl, methoxyphenyl and the like. The preferred organophosphorus compound for use in the present catalyst system is triphenyl phosphite.

The carboxylic acid containing compounds useful in the present invention as component (d) of the catalyst compositions include carboxylic acids and fluorinated carboxylic acids. Suitable carboxylic acids include $C_2-C_{12}$ aliphatic and $C_6-C_{18}$ aromatic carboxylic acids including acetic acid, propionic acid, butyric acid, decanoic acid, benzoic acid and the like, as well as $C_2-C_{18}$ dicarboxylic acids including terephthalic acid, isophthalic acid, oxalic acid and the like. The preferred carboxylic acids for use as component (d) in the catalyst system are fluorinated carboxylic acids. The fluorinated carboxylic acids may be partially or fully fluorinated, preferably fully fluorinated. Suitable fluorinated carboxylic acids include but are not limited to fluoroacetic acid, difluoroacetic acid, trifluoroacetic acid, as well as any of the above carboxylic acids containing fluorine substituents. The preferred compound for use as component (d) is trifluoroacetic acid.

The four catalyst components interact to form the active catalyst. Accordingly, the optimum concentration for any one component is dependent upon the concentration of each of the other components. In the catalyst system of this invention, the polymerization of a 1,3-diene monomer to diene polymer may be conducted using a broad range of catalyst component concentrations. Thus, the molar ratio of catalyst components a, b, c and d (defined above) is preferably as follows: a:b is between about 1:1 to 1:70, preferably 1:1 to 1:20; a:c is between about 1:0.1 to 1:10; and a:d is between 1:1 to about 1:70, preferably 1:1 to about 1:20. The preferred molar ratios of a: b: c: d are from 1:1.5:1:1.5 to 1:15:1:15.

The four catalyst components may be introduced into the polymerization system in several ways. Thus, the four catalyst components may be charged to a solution of the 1,3-diene in a stepwise or simultaneous manner which is commonly referred to in the polymerization art as an "in-situ" catalyst charge procedure. Alternatively, the catalyst may also be prepared outside of the polymerization system by a procedure in which all of the catalyst components are mixed in the presence of a small amount of 1,3-diene monomer in an inert diluent and the complete blend is then added to the polymerization system.

The concentration of the total catalyst composition employed in the method of the invention can vary considerably and is dependent upon factors such a purity, rate of polymerization desired, temperature, and the like. Accordingly, specific overall concentrations of the catalyst compositions cannot be set forth except to state that such concentrations are catalytically effective amounts. Generally the NiOB catalyst is employed in amounts ranging from 0.05 to 10 mM phgm. The remaining catalyst components are employed in the previously recited ratio amounts. Some specific concentrations and ratios which produce polybutadiene polymers havirig the desired properties are illustrated in the examples below.

The polymerizations of this invention are conducted in an inert hydrocarbon solvent and are consequently solution polymerizations. The term "inert solvent" means that the solvent does not enter into the structure of the resulting polymer, does not adversely affect the properties of the resulting polymer and does not adversely affect the activity of the catalyst employed. Suitable hydrocarbon solvents which may be employed include aliphatic, aromatic or cycloaliphatic hydrocarbons such as hexane, pentane, toluene, benzene, cyclohexane and the like. The preferred hydrocarbon solvents are aliphatic hydrocarbons and of these solvents, hexane is particularly preferred.

The polymerizations of the invention should be carried out under an inert atmosphere such as nitrogen and precautions should be taken to exclude materials such as water and air which will-deactivate the catalyst components.

The temperatures employed in the polymerization are not critical and may range from about 0° C. to about 150° C.

Preferred polymerization temperatures may range from about 25° C. to about 130° C. It should be noted that the catalyst compositions of the invention provide the capability of more consistently using higher polymerization temperatures than those which have heretofore been actually exemplified in most prior art catalyst systems.

The polymerizations may be terminated in well known manner by the addition of a small amount of a lower alcohol such as methanol and an antioxidant such as di-t-butyl cresol.

The diene polymer product can be recovered from solution in any known manner such as by coagulation in an excess of methanol or other lower alkanol. The polymer product can be dried using any convenient method such as vacuum drying, drum drying, extruder drying, and the like.

The crystalline diene polymers produced by the method of the invention have a high content of trans-1,4 addition along with two distinct melting points. The first melting point (Tm1) ranges from 30° to 60° C., preferably 45° to 50° C. and the second melting point (Tm2) ranges from 70° to 130° C., preferably 70° C. to 107° C. The second melting point (Tm2) is controlled by the polymerization temperature, but the first melting point (Tm1) is always in the range of 30° to 60° C. at any polymerization temperature. The diene polymers produced according to the present invention have trans-1,4 addition contents of 80 to 95% and preferably from about 88% to about 92%.

The crystalline high trans diene polymers produced according to the process of the present invention preferably possess a microstructure having 88% to 92% of 1,4-trans units, 2% to 5% of cis units and 6% to 8% vinyl units. These crystalline diene polymers are useful as additives to natural and synthetic rubbers to improve processability of the rubber compounds by reducing the dump temperature, by reducing Mooney viscosity of the compounds and by reducing the shrinkage of the various compound stocks.

The crystalline high trans-1,4 polybutadiene polymers produced according to the present invention are typically added to natural rubbers and synthetic rubbers in amounts ranging from 1 to 30 percent by weight, preferably 5 to 15 percent by weight.

The following examples are submitted for the purpose of further illustrating the nature of the present invention and are not to be regarded as a limitation on the scope thereof. Parts and percentages shown in the examples are by weight unless otherwise indicated.

EXAMPLE A

To a two gallon stainless reactor equipped with thermometer, stirrer, heating means, pressure means inlet and outlet ports which was maintained under a nitrogen atmosphere was charged 3538 grams of a butadiene/hexane blend containing 768 grams of 1,3-butadiene (21.7% monomer concentration), 2.4 ml of nickel boro acylate (0.08 molar solution in hexane) in 30 ml of dry hexane, 25 ml of triisobutyl aluminum (0.77 molar solution in hexane) and a complex of one mole boron trifluoride with two moles of n-hexanol (5.2 ml) in 30 ml of dry hexane. The ratio of nickel boro acylate to triisobutyl aluminium was approximately 1:100. The polymerization was then conducted at 70° C. for 90 min. The resulting polymer cement was dropped into a five gallon bucket equipped with a polyethylene liner containing a half gallon of hexane, anti-oxidant and a short-stopper. The hexane-diluted cement was steam-desolventized, followed by over-drying at 80° C. The conversion of monomer to polymer was 90.1%. The physical property of the resultant polymer (Sample A) is described below. This polymer was used for comparative sudies and for incorporation into the rubber blend with the crystalline Hi-Trans BR.

a. ML(1+4) at 100° C.: 63.0
b. $Mn(\times 10^{-4})$: 10.9
   $Mw(\times 10^{-4})$: 59.5
   Mw/Mn: 5.45
   $[\eta]$ in THF: 3.26
c. Microstructure
   (infrared analysis)
   % 1,4 Cis content: 96.9
   % 1,4-Trans content: 2.0
   % 1,2 content: 1.1

EXAMPLES 1–6

The material used in this study was a rubber blend of natural rubber (NR)/Hi-Cis polybutadiene rubber (BR) (50:50) replaced partially with crystalline Hi-Trans BR. Crystalline Hi-Trans BR has two melting points at 46° C. and 106° C. Microstructure of this polymeric resin is 93.4% 1,4-trans, 1.5% 1,4-cis and 5.5% 1,2. This polymer has a Mn=44,000 and a Mw/Mn of 1.20. The rubber composition was prepared according to a compounding recipe as shown in the following Table 1. Examples 1 to 3 are comparative examples while Examples 4 to 6 display the blends of the present invention.

TABLE

| Compounding component | Part by weight |
| --- | --- |
| Natural Rubber (NR) | 50 |
| Hi-Cis polybutadiene rubber (BR) | 50–30 |
| Crystalline Hi-Trans BR | Varied |
| Carbon Black | 50 |
| Stearic acid | 2.0 |
| ZnO | 2.0 |
| Wax | 4.0 |
| Anti-Oxidant | 3.0 |
| Vulcanization accelerator | 0.8 |
| Sulfur | 1.27 |
| PVI | 0.1 |

A test specimen was prepared by curing the rubber composition at 145° C. for 25 minutes. The results are shown in the following Table 2.

TABLE 2

| | Example | | | | | |
| --- | --- | --- | --- | --- | --- | --- |
| | 1 | 2 | 3 | 4 | 5 | 6 |
| Rubber | | | | | | |
| Natural Rubber | 50 | 50 | 50 | 50 | 50 | 50 |
| Hi-Cis BR (BRO1)*a | 50 | | | | | |
| Hi-Cis BR | | 50 | | | | |

TABLE 2-continued

| | Example | | | | | |
|---|---|---|---|---|---|---|
| | 1 | 2 | 3 | 4 | 5 | 6 |
| (Buna CB24)*b | | | | | | |
| Hi-Cis BR (Sample A) | | | 50 | 45 | 40 | 30 |
| Hi-Trans BR*c | | | | 5 | 10 | 20 |
| Monsanto Rheometer | | | | | | |
| TS2 | 8.00 | 7.13 | 7.07 | 7.19 | 7.27 | 7.44 |
| TC90 | 12.38 | 12.05 | 11.37 | 11.56 | 12.13 | 12.18 |
| ML | 7.50 | 8.01 | 8.42 | 7.99 | 6.95 | 5.71 |
| MH | 27.38 | 30.45 | 29.20 | 28.01 | 25.67 | 21.15 |
| Compound ML1 + 4 @ 100° C. | 64.1 | 69.8 | 75.4 | 70.4 | 63.2 | 51.8 |
| Vulcanizate Properties | | | | | | |
| 300% Modulus @ 23° C. | 1325 | 1596 | 1334 | 1495 | 1469 | 1529 |
| Tensile strength | 2623 | 3053 | 2765 | 3126 | 2896 | 2355 |
| % Elongation | 553 | 527 | 568 | 580 | 572 | 510 |
| Shore "A" hardness | | | | | | |
| @23° C. | 56 | 58 | 57 | 60 | 65 | 73 |
| @100° C. | 52 | 55 | 54 | 53 | 53 | 52 |
| Rebound Resilience | | | | | | |
| @23° C. | 54.8 | 60.0 | 59.2 | 58.8 | 55.4 | 50.4 |
| @100° C. | 61.6 | 65.2 | 66.0 | 63.4 | 60.6 | 55.4 |
| Dispersion index | 97.7 | 93.6 | 98.1 | 97.7 | 97.6 | 98.1 |

*a: Japan Synthetic Rubber Co. ---- Ni-Catalyzed Hi-Cis BR
*b: Bayer Co. ---- Nd-catalyzed Hi-Cis BR
*c: Nd-catalyzed Hi-Trans BR (D. K. Jenkins: U.S. 4,619,982)

EXAMPLE B

Five 28 ounce beverage bottles equipped with rubber liner and three hole crown cap were charged with 270 grams of a purified Bd/hexane blend (24.7 percent by weight 1,3-butadiene). Then, the catalyst components were charged to each bottle in the following order: (1) Nickel Boro Acylate hereafter NiOB, in hexane (0.825 molar solution in hexane); (2) triisobutyl aluminum, hereafter TIBAL, (20 weight %) in hexane; (3) triphenyphosphite, hereafter TPP, (neat) and trifluoroacetic acid, hereafter TFA. The molar ratios of TPP to Ni were varied. After addition of catalyst components were completed, the polymerization was conducted at three different temperatures (30°, 50° and 80° C.) in a water bath for 16 hours. The polymerization was terminated with a small amount of isopropanol and an antioxidant. The resultant polymer was recovered by coagulation with excess isopropanol, followed by filtration. The resinous polymer was dried at 50° C. under vacuum. The weights and molar ratios of the various catalyst components used in the polymerization, the polymerization conditions and polymer properties are shown in Table 3 as Examples B-1 to B-5.

TABLE 3

| | Example | | | | |
|---|---|---|---|---|---|
| | B-1 | B-2 | B-3 | B-4 | B-5 |
| 1,3-Bd, % | 24.7 | 24.7 | 24.7 | 24.7 | 24.7 |
| 1,3-Bd, grams | 67.0 | 67.0 | 67.0 | 67.0 | 67.0 |
| NiOB, mM phgm | 1.0 | 1.0 | 1.0 | 1.0 | 1.0 |
| TIBAL, mM phgm | 3.0 | 3.0 | 3.0 | 3.0 | 3.0 |
| TFA, MM phgm | 10.0 | 10.0 | 10.0 | 10.0 | 10.0 |
| TPP, mM phgm | 1.0 | 1.0 | 1.0 | 1.0 | 1.0 |
| Molar ratios | | | | | |
| NiOB/TiBAl/TFA | 1:3:10 | 1:3:10 | 1:3:10 | 1:3:10 | 1:3:10 |
| NiOB/TPP | 1:1 | 1:1 | 1:0.5 | 1:0.5 | 1:0.5 |
| Type Catalyst Charge | In-situ | In-situ | In-situ | In-situ | In-situ |
| Polymerization Condition | | | | | |
| Temp °C. | 50 | 80 | 30 | 50 | 80 |
| Time, hr | 16 | 16 | 16 | 16 | 16 |
| Conversion % | 5.9 | 56.9 | 6.0 | 41.8 | 83.0 |
| Polymer Properties | | | | | |
| DSV | 0.44 | 0.83 | 0.48 | 1.06 | 0.80 |
| % Gel | N.D. | N.D. | N.D. | N.D. | N.D. |
| [η] | 0.46 | 0.81 | 0.47 | 1.05 | 0.79 |
| GPC Data | | | | | |
| Mn | 22,000 | 37,000 | 25,000 | 52,000 | 33,000 |
| Mw/Mn | 1.25 | 1.86 | 1.27 | 1.79 | 2.17 |
| Microstructure | | | | | |
| % Cis-1,4 | 3.2 | 2.6 | 3.9 | 1.9 | 2.8 |
| % Trans-1,4 | 90.2 | 90.9 | 90.2 | 92.3 | 90.7 |
| % Vinyl | 6.7 | 6.5 | 5.9 | 5.8 | 6.5 |
| DSC Data | | | | | |
| Tm 1 (°C.) | 45.5 | 44.8 | 47.4 | 47.4 | 44.1 |
| Tm 2 (°C.) | 104.0 | 100.0 | 101.6 | 103.9 | 96.9 |

EXAMPLES 7–12

The general procedure of Example 3 was repeated except that Sample A was replaced with high cis butadiene or combinations of high cis butadiene and high trans butadiene. Sample B was Hi-Cis BE of 96.0% cis, 2.4% trans and 1.6% vinyl with a Mn=94,000 and a Mw/Mn of 5.25. The Mooney ML1+4 at 100° C. was 49. The microstructure of NiOB-catalyzed crystalline Hi-Trans BR as prepared (Example B-5) used in Examples 11 and 12 in this invention is 90.7% 1,4-trans, 8 2.8% 1,4-cis and 6.5% 1,2. The melting points of this polymer are at 44.1° and 96.9° C. The physical properties of the resultant polymer blends are shown in Table 4.

TABLE 4

| | Example | | | | | |
|---|---|---|---|---|---|---|
| | 7 | 8 | 9 | 10 | 11 | 12 |
| Rubber | | | | | | |
| Natural Rubber | 50 | 50 | 50 | 50 | 50 | 50 |
| Hi-Cis BR (BR01)*a | 50 | | | | | |
| Hi-Cis BR (150L)*b | | 50 | | | | |
| Hi-Cis BR (Buna CB24)*c | | | 50 | | | |
| Hi-Cis BR (Sample B) | | | | 50 | 45 | 40 |
| Hi-Trans BR (B-5) | | | | | 5 | 10 |

TABLE 4-continued

|  | Example | | | | | |
|---|---|---|---|---|---|---|
|  | 7 | 8 | 9 | 10 | 11 | 12 |
| Monsanto Rheometer | | | | | | |
| TS2 | 7.54 | 7.27 | 7.20 | 7.29 | 7.50 | 7.45 |
| TC90 | 12.26 | 12.09 | 12.18 | 12.05 | 12.40 | 12.52 |
| ML | 7.56 | 8.38 | 8.32 | 8.45 | 7.99 | 6.97 |
| MH | 26.66 | 29.37 | 29.75 | 28.28 | 27.13 | 25.54 |
| Compound ML1 + 4 @ 100° C. | 64.0 | 68.4 | 68.9 | 72.7 | 68.0 | 59.6 |
| Vulcanizate Properties | | | | | | |
| 300% Modulus @ 23° C. | 1302 | 1514 | 1389 | 1343 | 1268 | 1332 |
| Tensile strength | 2809 | 3173 | 2990 | 2892 | 2806 | 2948 |
| % Elongation | 575 | 560 | 577 | 578 | 592 | 609 |
| Shore "A" hardness | | | | | | |
| @23° C. | 58 | 60 | 61 | 60 | 64 | 68 |
| @100° C. | 55 | 55 | 56 | 55 | 54 | 54 |
| Rebound Resilience | | | | | | |
| @23° C. | 54.8 | 58.4 | 58.4 | 57.0 | 55.6 | 52.6 |
| @100° C. | 64.8 | 67.8 | 68.4 | 66.8 | 63.6 | 60.8 |
| Dispersion index | 98.8 | 98.2 | 98.1 | 98.8 | 98.5 | 98.4 |

TABLE 4-continued

|  | Example | | | | | |
|---|---|---|---|---|---|---|
|  | 7 | 8 | 9 | 10 | 11 | 12 |

*a: Japan Synthetic Rubber Co. ---- Ni-Catalyzed Hi-Cis BR
*b: Ube Industries ---- Co-catalyzed Hi-Cis BR
*c: Bayer Co. ---- Nd-catalyzed Hi-Cis BR

We claim:

1. A rubbery composition comprised of a blend of 70 to 95 parts by weight of at least one diene rubber selected from natural rubber, cis 1,4-polyisoprene rubber, styrene-butadiene copolymer rubber, styrene-isoprene-butadiene rubber and 5 to 30 parts by weight of a trans 1,4-polybutadiene having a first melting point ranging between 30° C. to 60° C. and a second melting point ranging between 70° C. to 130° C.

2. The rubbery composition as defined in claim 1 wherein the trans 1,4-polybutadiene has a trans content from 80 to 95%.

3. The rubbery composition as defined in claim 1 wherein the trans 1,4-polybutadiene has a trans content varying from about 88% to about 92%.

4. The rubbery composition as defined in claim 1 wherein the first melting point ranges between 45° C. to 50° C. and the second melting point ranges between 70° C. to 107° C.

5. A rubber tire having a rubber component comprised of the rubbery composition as defined in claim 1.

* * * * *